(12) United States Patent
Pang et al.

(10) Patent No.: US 10,496,804 B2
(45) Date of Patent: Dec. 3, 2019

(54) FINGERPRINT AUTHENTICATION METHOD AND SYSTEM, AND TERMINAL SUPPORTING FINGERPRINT AUTHENTICATION

(71) Applicant: SHENZHEN GOODIX TECHNOLOGY CO., LTD., Shenzhen, Guangdong (CN)

(72) Inventors: Shu Pang, Shenzhen (CN); Jinchun Ye, Shenzhen (CN); Hongwei Xu, Shenzhen (CN); Hongsheng Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 181 days.

(21) Appl. No.: 15/460,845

(22) Filed: Mar. 16, 2017

(65) Prior Publication Data

US 2017/0185765 A1    Jun. 29, 2017

Related U.S. Application Data

(63) Continuation of application No. PCT/CN2015/094710, filed on Nov. 16, 2015.

(30) Foreign Application Priority Data

Feb. 12, 2015   (CN) .......................... 2015 1 0074067

(51) Int. Cl.
*G06F 21/31*   (2013.01)
*H04L 29/06*   (2006.01)
(Continued)

(52) U.S. Cl.
CPC ............ *G06F 21/32* (2013.01); *G06F 21/316* (2013.01); *H04L 63/0861* (2013.01); *H04W 12/06* (2013.01)

(58) Field of Classification Search
CPC ...... G06F 21/32; G06F 21/316; H04W 12/06; H04L 63/0861
See application file for complete search history.

(56) References Cited

U.S. PATENT DOCUMENTS

| 2004/0168091 A1* | 8/2004 | Hillhouse | ............... G06F 21/32 726/7 |
| 2004/0172562 A1 | 9/2004 | Berger | |

(Continued)

FOREIGN PATENT DOCUMENTS

| CN | 102222389 A | 10/2011 |
| CN | 102708360 A | 10/2012 |

(Continued)

OTHER PUBLICATIONS

International Search Report issued in PCT/CN2015/094710, dated Feb. 6, 2016.

(Continued)

*Primary Examiner* — Alexander Lagor
*Assistant Examiner* — Vu V Tran
(74) *Attorney, Agent, or Firm* — Heslin Rothenberg Farley & Mesiti P.C.

(57) ABSTRACT

A fingerprint authentication method and system and a terminal supporting a fingerprint authentication are provided. The fingerprint authentication method includes the following steps: a fingerprint receiving step: receiving fingerprint information input by a user; and a fingerprint template matching step: selecting a fingerprint template that has a highest using frequency from fingerprint templates on which matching has not been performed, and matching the fingerprint template with the fingerprint information. A fingerprint authentication succeeds when the fingerprint template matches with the fingerprint information, and the fingerprint (Continued)

template matching step is re-performed when the fingerprint template fails to match with the fingerprint information.

14 Claims, 7 Drawing Sheets

(51) Int. Cl.
  *G06F 21/32* (2013.01)
  *H04W 12/06* (2009.01)

(56) References Cited

U.S. PATENT DOCUMENTS

| | | | |
|---|---|---|---|
| 2005/0188226 | A1 | 8/2005 | Kasatani |
| 2006/0129840 | A1 | 6/2006 | Milgramm et al. |
| 2014/0002240 | A1* | 1/2014 | Marciniak .......... G06K 9/00885 340/5.83 |
| 2014/0139318 | A1 | 5/2014 | Malpani et al. |
| 2015/0347810 | A1* | 12/2015 | Boshra ............... G06F 16/583 382/124 |
| 2016/0147987 | A1* | 5/2016 | Jang .................. G06F 21/32 726/19 |
| 2016/0292490 | A1* | 10/2016 | Cheng ............... G06K 9/00033 |

FOREIGN PATENT DOCUMENTS

| | | | | |
|---|---|---|---|---|
| CN | 103699825 A | | 4/2014 | |
| CN | 103971043 A | | 8/2014 | |
| CN | 104335216 A | | 2/2015 | |
| KR | 2014/006565 | * | 7/2014 | ............ G06F 21/32 |
| WO | 2014004541 A1 | | 1/2014 | |

OTHER PUBLICATIONS

Extended European Search Report for European Patent Application No. 15881829.4, dated Aug. 16, 2017.

* cited by examiner

FINGERPRINT AUTHENTICATION METHOD AND SYSTEM, AND TERMINAL SUPPORTING FINGERPRINT AUTHENTICATION

CROSS-REFERENCE TO RELATED APPLICATIONS

The present application is a continuation of international application No. PCT/CN2015/094710, filed on Nov. 16, 2015, which claims priority to Chinese Patent Application No. CN201510074067.4, filed on Feb. 12, 2015, both of which are hereby incorporated herein by reference in their entireties.

TECHNICAL FIELD

The present disclosure relates to the technical field of fingerprint recognition, and in particular, to a fingerprint authentication method and system, and a terminal supporting fingerprint authentication.

BACKGROUND

With the spread of mobile payment and the increase in users' awareness of security, now more and more smart phones and tablet has been integrated with fingerprint recognition modules. At present, the main use of a fingerprint recognition module in a mobile phone is unlocking screen by a fingerprint instead of a password, and therefore the speed of fingerprint recognition is a main factor that affects user experience.

Figure 1A:
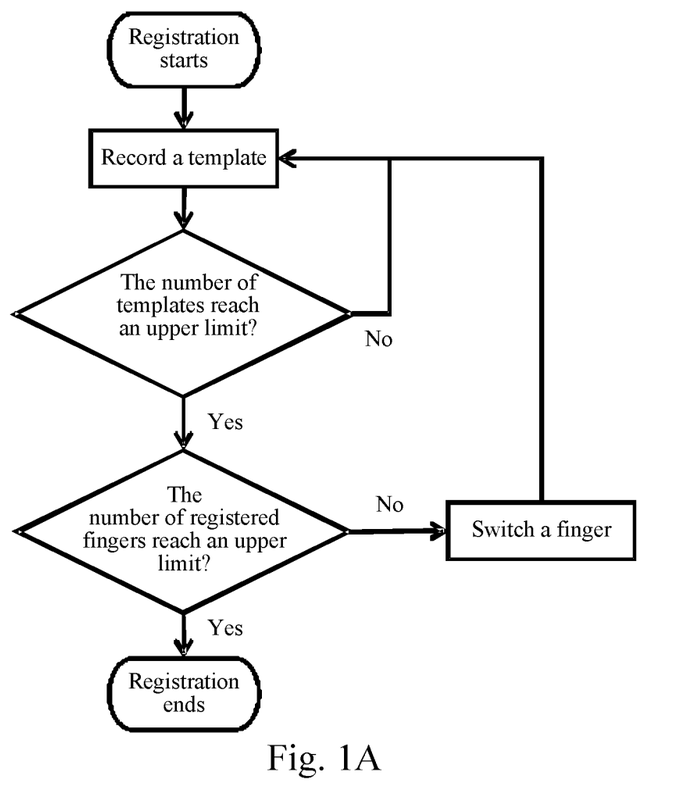
FIG. 1A and FIG. 1B are flow charts of fingerprint registration and fingerprint matching provided by the prior art, respectively.
Figure 1B:
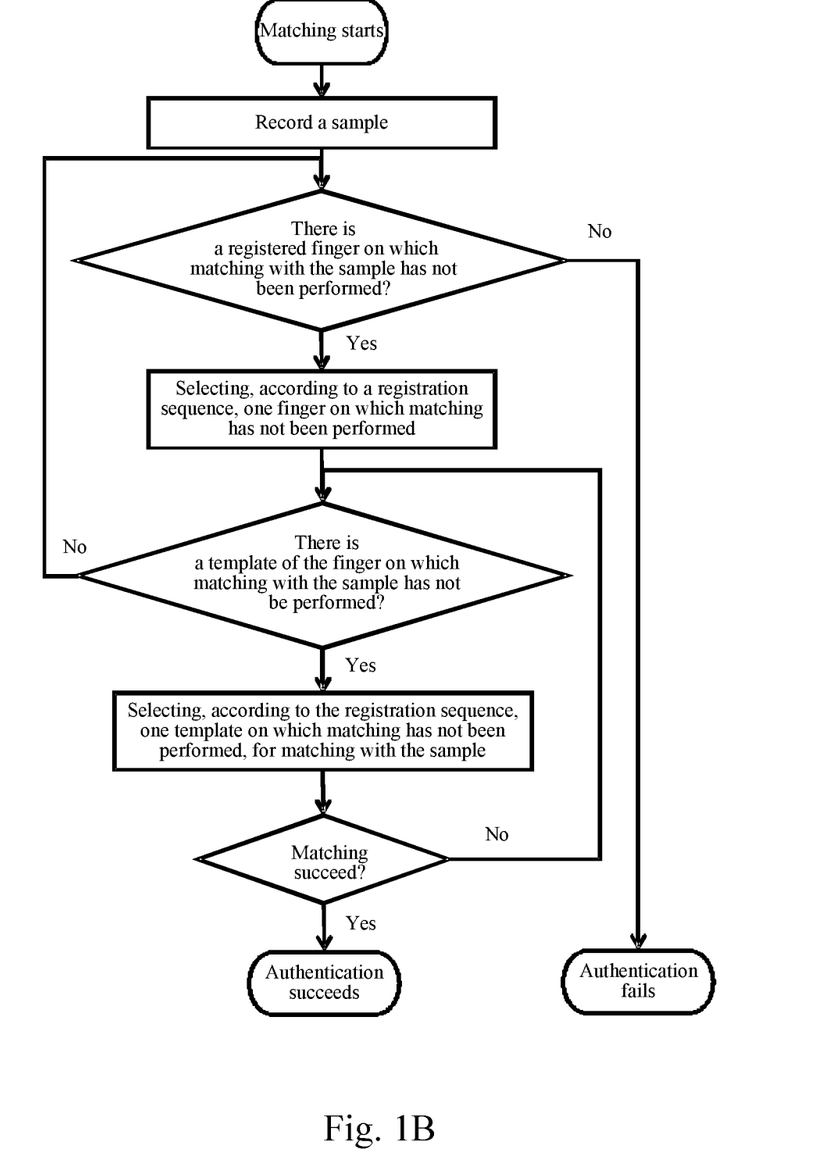

At present, the use of a fingerprint recognition function generally includes two major steps: 1. fingerprint registration; and 2. fingerprint matching. The fingerprint registration refers to a process of recording an authorized fingerprint feature to a device. The procedure of the fingerprint registration is shown in FIG. 1A. Generally, a device supports recording of several fingers. A fingerprint recognition module in a mobile phone generally is much smaller than a finger, and therefore a user needs to press the fingerprint recognition module for several times to record fingerprint features at different regions of a finger, so as to register the entire finger. Generally, every recorded fingerprint feature is referred to as a template. The fingerprint matching refers to a process of inputting a fingerprint feature when a user performs identity authentication and performing matching and recognition with an authorized fingerprint feature (that is, a template) which has been registered in a device. The procedure is shown in FIG. 1B. If a match rate exceeds a set threshold, it is considered that the authentication succeeds, and otherwise the authentication fails. Generally, an input fingerprint feature to be authenticated is referred to as a fingerprint sample.

As can be seen from the procedure shown in FIG. 1B, in the existing fingerprint matching and recognition method, all templates are matched with the sample in sequence, which causes with increase of the number of registered fingers and templates, the fingerprint time for matching becomes longer.

SUMMARY

A first technical problem to be resolved by the present disclosure lies in providing a fingerprint authentication method, which intends to increase the speed of fingerprint recognition and provide a better user experience.

The present disclosure is implemented as follows: a fingerprint authentication method including the following steps:

a fingerprint receiving step: receiving fingerprint information input by a user; and a fingerprint template matching step: selecting a fingerprint template that has a highest using frequency from fingerprint templates on which matching has not been performed, and matching the fingerprint template with the fingerprint information, wherein a fingerprint authentication succeeds when the fingerprint template matches with the fingerprint information, and the fingerprint template matching step is re-performed when the fingerprint template fails to match with the fingerprint information.

A second technical problem to be resolved by the present disclosure lies in providing a fingerprint authentication system, including:

a fingerprint receiving module configured to receive fingerprint information input by a user; and a fingerprint template matching module configured to select a fingerprint template that has a highest using frequency from fingerprint templates on which matching has not been performed, and match the fingerprint template with the fingerprint information, wherein a fingerprint authentication succeeds when the fingerprint template matches with the fingerprint information, and the fingerprint template matching module re-performs selecting and matching when the fingerprint template fails to match with the fingerprint information.

A third technical problem to be resolved by the present disclosure lies in providing a terminal supporting a fingerprint authentication, including the fingerprint authentication system as described above.

In the present disclosure, by learning and making statistics of operating habits of a user, adjusting a matching sequence of fingerprint templates, and matching by directly using a fingerprint template having a highest possibility of successful matching, the speed of fingerprint recognition can be effectively increased, and better user experience can be brought to users.

DETAILED DESCRIPTION

In order to make the objective, the technical solutions, and the advantages of the present disclosure more clear and easy to understand, the present disclosure is further described in detail in the embodiments in combination with the accompanying drawings. It should be understood that the specific embodiments described herein are used only to interpret the present disclosure, but are not intended to limit the present disclosure.

In the present disclosure, in consideration of the facts that a user normally uses an accustomed finger to perform a fingerprint recognition due to operating habits and an area of the finger used in fingerprint recognition is also relatively centralized, the present disclosure improves the speed of fingerprint matching by means of learning and making statistics of the operating habits of the user.

Figure 2:
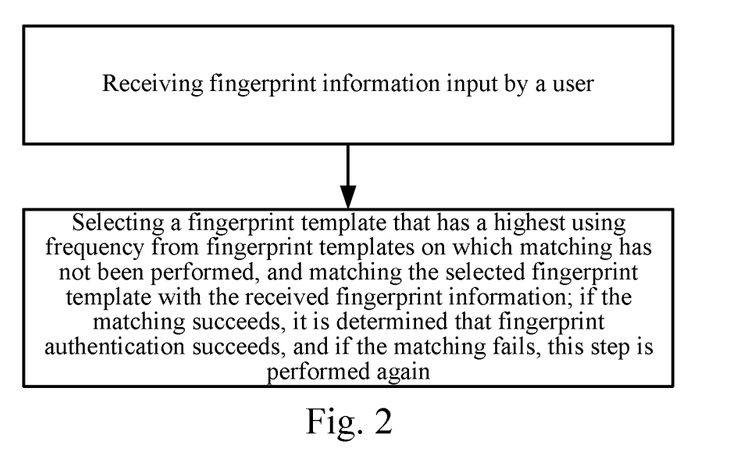
FIG. 2 is an implementation flow chart of a fingerprint authentication method provided in the present disclosure.

On the basis of the foregoing principles, FIG. 2 shows an implementation flow chart of a fingerprint authentication method provided in the present disclosure, and details are as follows.

The fingerprint authentication method as shown in FIG. 2 firstly requires operating habits of a user to be learned and counted. That is, a using frequency of each fingerprint template is recorded, to find a fingerprint template with a possibility of having a highest matching degree with a fingerprint sample. In specific application, the method mainly includes a fingerprint receiving step and a fingerprint template matching step. In the fingerprint receiving step, fingerprint information (that is, a fingerprint sample) input by a user is received. Then, the fingerprint template matching step is performed, which specifically includes, selecting a fingerprint template that has a highest using frequency from fingerprint templates on which matching has not been performed, and matching the selected fingerprint template with the received fingerprint information; if the matching succeeds, it is determined that fingerprint authentication succeeds, and if the matching fails, this step is performed again.

As can be seen from the above method, in the present disclosure, a matching sequence of fingerprint templates is adjusted, a fingerprint template having a highest possibility of successful matching (that is, the fingerprint template that has the highest using frequency is considered to have the highest possibility of successful matching) is directly used for matching. As such, a speed of fingerprint recognition can be effectively increased, and better user experience can be brought about for users.

Figure 3:
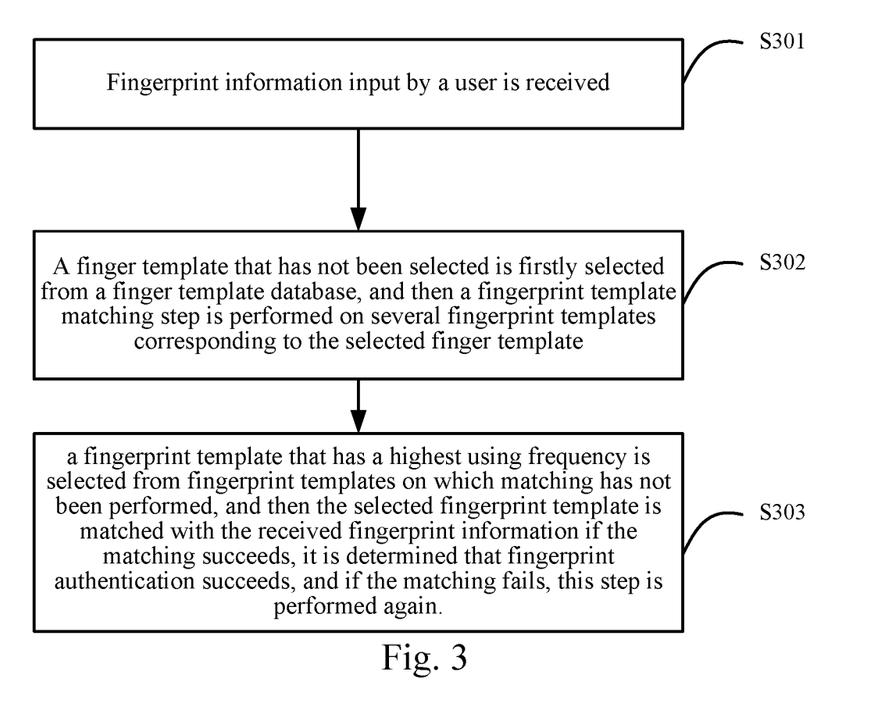
FIG. 3 is a flow chart of a fingerprint authentication method improved on the basis of the fingerprint authentication method shown in FIG. 2.

Further in consideration of the fact that a terminal may be used by several persons, or one same person may use different fingers in different operations, there may be several fingerprint templates having relative high using frequencies. To further improve the matching speed, as an improvement of the present disclosure, a finger template is determined prior to fingerprint matching. Referring to FIG. 3, the method includes the following steps:

Step S301 is a fingerprint receiving step: fingerprint information input by a user is received.

Step S302 is a finger template selection step: a finger template that has not been selected is firstly selected from a finger template database, and then a fingerprint template matching step is performed on several fingerprint templates corresponding to the selected finger template.

In the present disclosure, each finger template corresponds to several fingerprint templates. Differences between the several fingerprint templates that pertain to the same finger template mainly lie in aspects of touch areas, press strength, sharpness, or the like. In this step, the finger template may be selected on the basis of a using frequency, a priority level, or a current application scenario. Descriptions are as follows.

Embodiment 1: Selecting a Finger Template on the Basis of a Using Frequency

Figure 4:
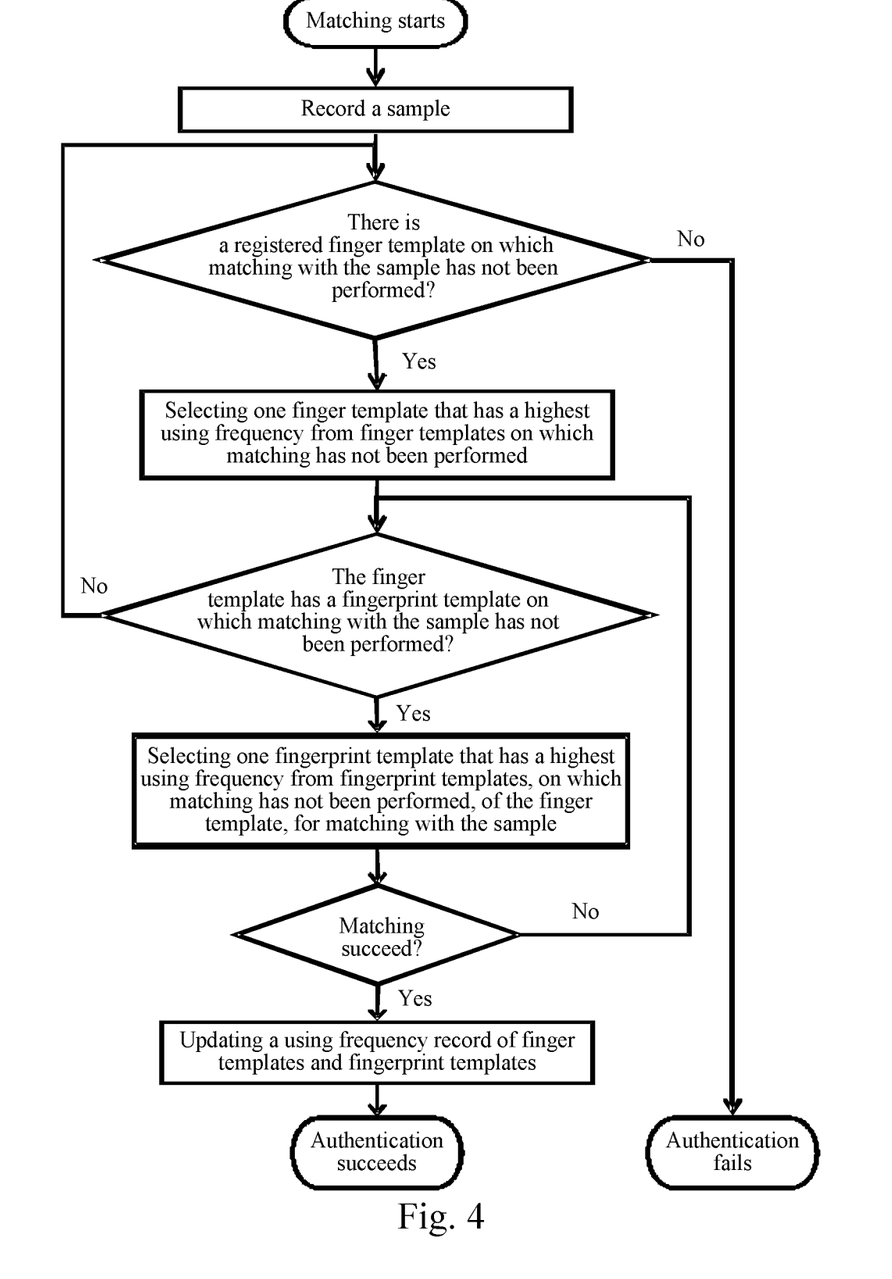
FIG. 4 is a flow chart of a fingerprint authentication method in which a finger template is selected on the basis of a using frequency according to a first embodiment of the present disclosure.

Referring to FIG. 4, in this embodiment, the finger template selection basis is to select a finger template that has a highest using frequency from finger templates that have not been selected. After the matching succeeds, using frequency record information of the finger templates and the fingerprint templates needs to be updated.

In this embodiment, each time the authentication succeeds, a fingerprint template having a highest matching degree with a fingerprint sample and a finger template to which the fingerprint template pertains are automatically recorded, and then a using frequency of each finger template and a using frequency of each fingerprint template corresponding to the finger template are obtained by means of statistics according to the recorded data. Each time when fingerprint matching authentication is performed, a fingerprint template having a high using frequency corresponding to a finger template having a high using frequency are preferably selected by algorithm according to the statistic using frequency data, for matching recognition with the fingerprint sample. Therefore, when the user performs fingerprint authentication using an accustomed method, a template having a highest matching probability according to the user's habits can be selected for matching by the algorithm, thereby reducing the matching times of matching and improving the overall matching speed.

Embodiment 2: Selecting a Finger Template on the Basis of a Priority Level

Figure 5:
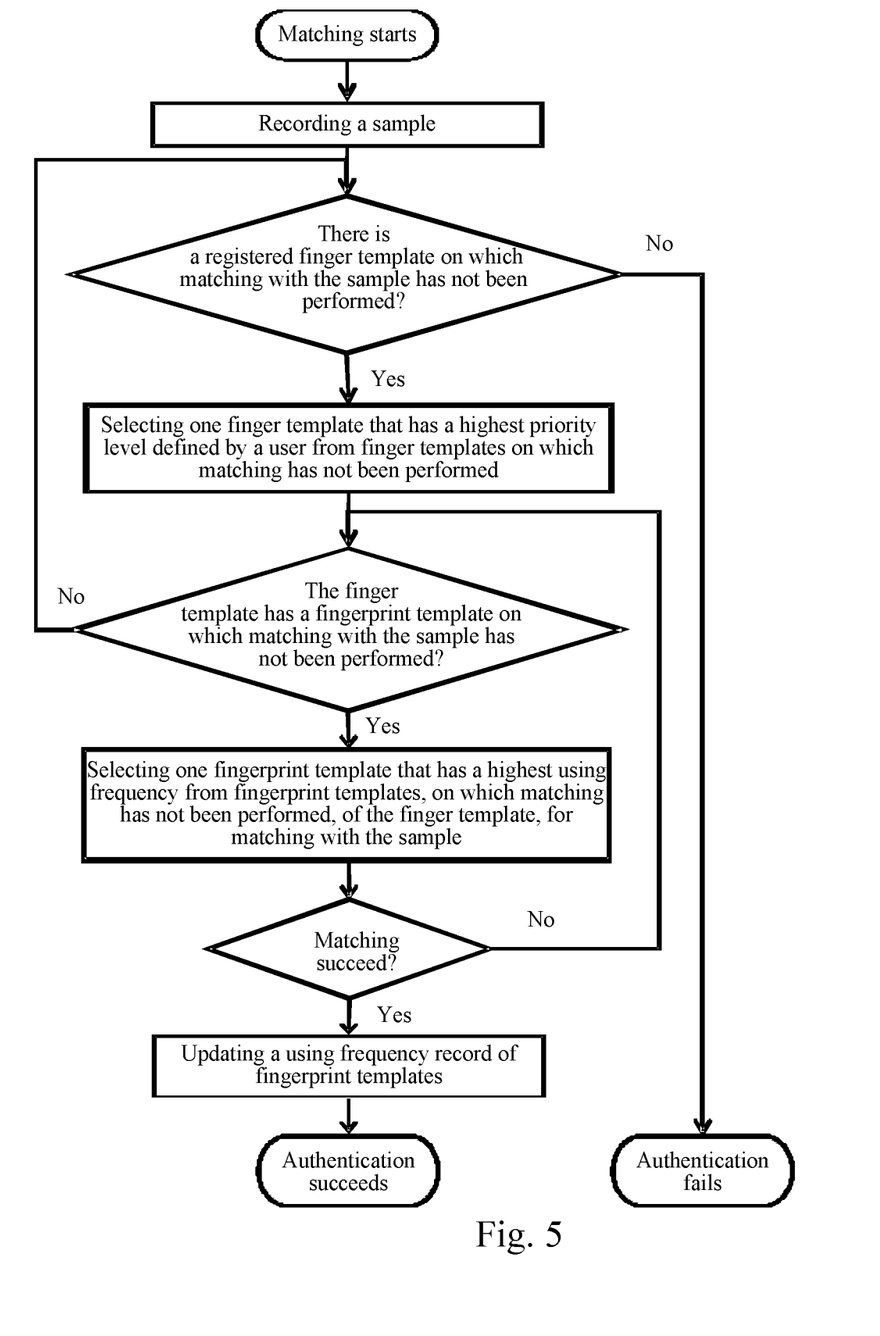
FIG. 5 is a flow chart of a fingerprint authentication method in which a finger template is selected on the basis of a priority level according to a second embodiment of the present disclosure.

Referring to FIG. 5, in this embodiment, a user is supported to define priority levels of fingers. That is, the user can independently define a priority level sequence of all finger templates. In this embodiment, the finger template selection basis is to select a finger template that has a highest priority level defined by the user from finger templates on which selection has not been performed. After the matching succeeds, using frequency record information of the fingerprint templates is updated.

As compared with embodiment 1, in embodiment 2, only a using frequency of each fingerprint template corresponding to each registered finger template is counted, while a using frequency of the registered finger template is not counted. In the method, a user is allowed to independently define priority levels of the fingers. That is, the user can independently define the using frequency of the registered finger template according to operating habits of the user. Each time when fingerprint matching authentication is performed, a fingerprint template having a high using frequency corresponding to a finger template having a high priority level is preferably selected by the algorithm, according to priority levels of the finger templates independently defined by the user and the statistic using frequencies of the fingerprint templates, for matching recognition with a fingerprint sample. As compared with the method of embodiment 1 in which using frequencies of the fingers are automatically counted by using an algorithm, the accuracy and flexibility of embodiment 2 are improved.

Embodiment 3: Selecting a Finger Template on the Basis of a Current Application Scenario Referring to FIG. 6, in this embodiment, classified statistics is performed on a using frequency of a finger template according to a specific application scenario. For example, a finger 1 is used most frequently for screen unlocking, and a finger 2 is used most frequently for mobile payment. In this embodiment, the finger template selection basis is to select a finger template that has a highest using frequency in a current application scenario from finger templates on which selection has not been performed. After the matching succeeds, using frequency record information of the finger templates and the fingerprint templates in the current application scenario is updated.

Figure 6:
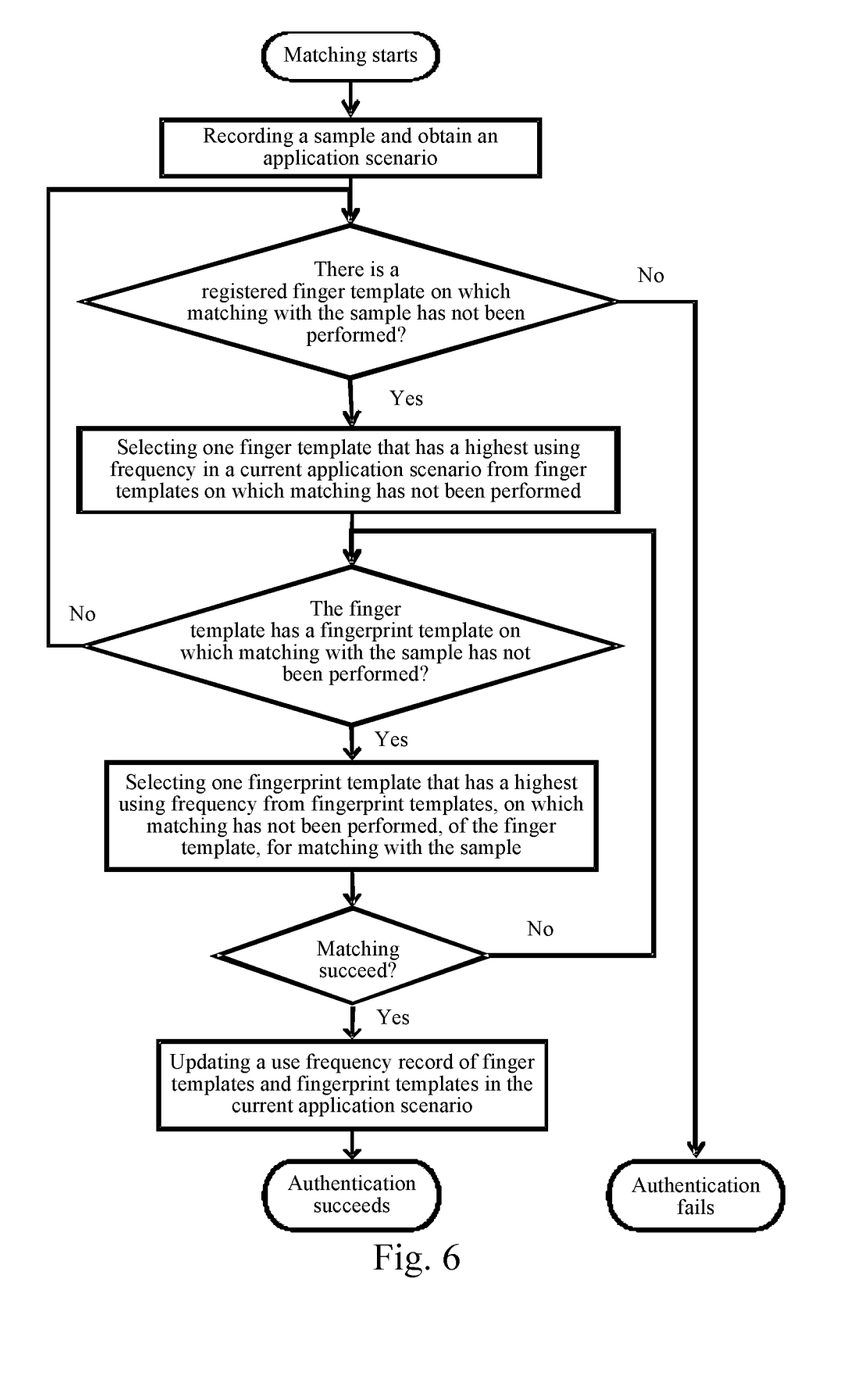
FIG. 6 is a flow chart of a fingerprint authentication method in which a finger template is selected on the basis of a current application scenario according to a third embodiment of the present disclosure.

As compared with embodiment 1, in the method provided in embodiment 3, a fingerprint matching algorithm needs to learn about an application scenario for performing matching authentication (for example, the algorithm needs to learn about whether a current matched scenario is identity authentication for screen unlocking or for mobile payment). In the algorithm, each time the authentication succeeds, a fingerprint template having a highest matching degree with a fingerprint sample, a finger template to which the fingerprint template pertains, and an application scenario are automatically recorded, and then a using frequency of each finger template and a using frequency of each fingerprint template corresponding to the finger template in different scenarios are obtained by means of statistics according to the recorded data. Each time when fingerprint matching authentication is performed, a fingerprint template having a high using frequency corresponding to a finger template having a high using frequency is preferably selected by the algorithm, according to the statistics using frequency data in the current application scenario, for matching recognition with the fingerprint sample. As compared with embodiment 1, although the complexity of the method is increased, the accuracy is also increased correspondingly.

It should be noted that a user can also independently define a priority level of a finger template in a specific application scenario. A finger template that has a highest priority level defined by a user in the application scenario is selected from finger templates on which selection has not been performed, and a fingerprint template having a high using frequency corresponding to the finger template is then selected for matching recognition with a fingerprint sample. After the matching succeeds, using frequency record information of fingerprint templates is updated.

Step S303 is a fingerprint template matching step: a fingerprint template that has a highest using frequency is selected from fingerprint templates on which matching has not been performed, and then the selected fingerprint template is matched with the received fingerprint information if the matching succeeds, it is determined that fingerprint authentication succeeds, and if the matching fails, this step is performed again.

During step S303, if all fingerprint templates corresponding to the selected finger template fail to match with the fingerprint sample, step S302 is performed again, to select a new finger template; and if no finger template on which selection has not been performed in the finger template database, the authentication fails.

A person of ordinary skill in the art may understand that all or some of the steps in the foregoing method provided by the embodiments may be implemented by a program instructing relevant hardware. The program may be stored in a computer readable storage medium. The storage medium may be a ROM/RAM, a magnetic disk, an optical disc, or the like.

Figure 7:
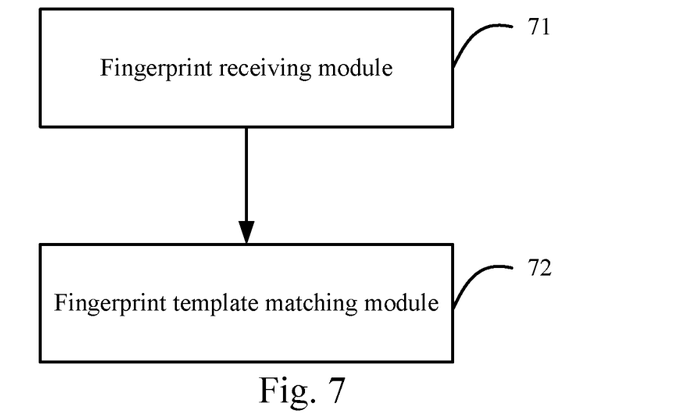
FIG. 7 is a schematic structural diagram of a fingerprint authentication system in the present disclosure.

FIG. 7 is a schematic structural diagram of a fingerprint authentication system provided in the present disclosure. To facilitate description, only relevant part of the present disclosure is shown. The processing system may be a software unit, a hardware unit, or a unit integrating software and hardware that is built in a terminal supporting a fingerprint recognition.

Referring to FIG. 7, the fingerprint authentication system includes a fingerprint receiving module 71 and a fingerprint template matching module 72. The fingerprint receiving module 71 is configured to receive fingerprint information input by a user. The fingerprint template matching module 72 is configured to select a fingerprint template that has a highest using frequency from fingerprint templates on which matching has not been performed, and then match the selected fingerprint template with the received fingerprint information. If the matching succeeds, it is determined that authentication succeeds; and if the matching fails, the fingerprint template matching module performs the selecting and matching again.

Figure 8:
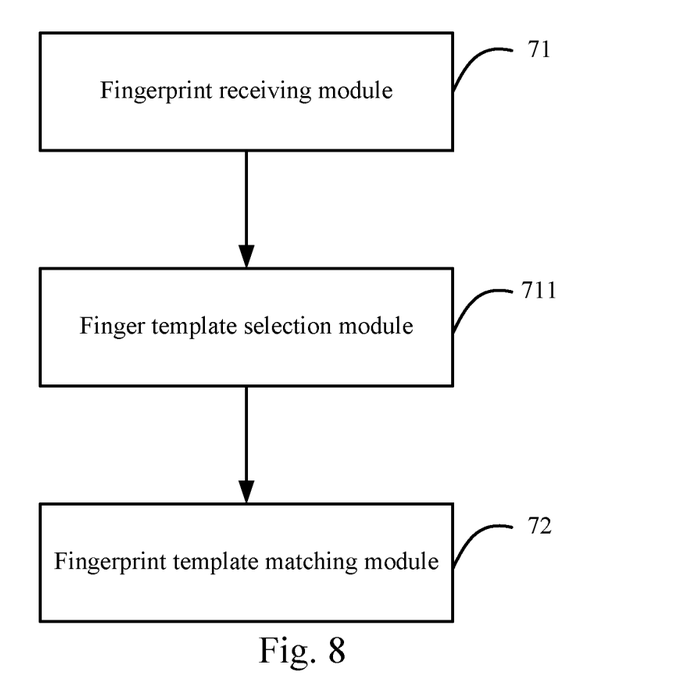
FIG. 8 is a schematic structural diagram of a fingerprint authentication system improved on the basis of the fingerprint authentication method shown in FIG. 7.

As stated above, in consideration of the fact that the terminal may be used by several persons, or one same person may use different fingers in different operations, as shown in FIG. 8, the authentication system may further include a finger template selection module 711, configured to select, from a finger template database, a finger template that has not been selected firstly, such that the fingerprint template matching module 72 selects, from several fingerprint templates corresponding to the selected finger template, a fingerprint template on which matching has not been performed and having a highest using frequency, to perform fingerprint template matching, in order to further increase the matching speed.

After the finger template is selected by the finger template selection module 711, if the fingerprint template matching module 72 fails in matching with respect to all fingerprint templates that correspond to the selected fingerprint template, the finger template selection module 711 performs finger template selection again to select a new finger template. If no finger template on which selection has not been performed in the finger template database, the authentication fails.

In the present disclosure selection of a finger template by the finger template selection module 711 may be on the basis of a using frequency, a priority level, or a current application scenario.

With respect to selection of a finger template on the basis of a using frequency, generally a finger template that has a highest using frequency is selected. The system further includes a first recording module, configured to update using frequency record information of the finger templates and the fingerprint templates after the matching succeeds.

With respect to selection of a finger template on the basis of a priority level, a user is supported to independently define priority levels of finger templates. That is, the user can independently define a priority level sequence of all the finger templates. Generally, a finger template that has a highest priority level defined by a user is selected from finger templates on which selection has not been performed. The system further includes a second recording module, configured to update using frequency record information of the fingerprint templates after the matching succeeds.

With respect to selection of a finger template on the basis of a current application scenario, classified statistics is performed on a using frequency of a finger template according to a specific application scenario. Generally, a finger template that has a highest using frequency in a current application scenario is selected from finger templates on which selection has not been performed. The system further includes a third recording module, configured to update using frequency record information of the finger templates and the fingerprint templates in the current application scenario after the matching succeeds.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A fingerprint authentication method, comprising the following steps:
    a fingerprint receiving step: receiving fingerprint information input by a user;
    a finger template selection step: selecting a finger template from a plurality of finger templates, wherein a basis for selecting the finger template is to select a finger template that has a highest using frequency in a current application scenario from the plurality of finger templates on which the selection has not been performed, the current application scenario being from a plurality of application scenarios;
    a fingerprint template matching step: selecting a fingerprint template from a plurality of fingerprint templates, the plurality of fingerprint templates corresponding to a finger template of a specific finger, that has a highest using frequency from fingerprint templates on which matching has not been performed, and matching the fingerprint template with the fingerprint information,
    wherein a fingerprint authentication succeeds when the fingerprint template matches with the fingerprint information, and
    the fingerprint template matching step is re-performed when the fingerprint template fails to match with the fingerprint information; and
    a using frequency recording step: updating using frequency record information of the fingerprint templates and finger templates in the current application scenario when the fingerprint template matches with the fingerprint information.

2. The fingerprint authentication method according to claim 1, wherein before the fingerprint template matching step, the method further comprises a following step:
    a finger template selection step: selecting, from a finger template database, the finger template.

3. The fingerprint authentication method according to claim 2, wherein in the fingerprint template matching step, if all the fingerprint templates corresponding to the finger template as selected fail to match with the fingerprint information, the finger template selection step is performed again to select a new finger template; and if no finger template on which selection has not been performed in the finger template database, the fingerprint authentication fails.

4. The fingerprint authentication method according to claim 2, wherein in the finger template selection step, a basis for selecting a finger template is to select a finger template that has a highest using frequency from the finger templates on which selection has not been performed.

5. The fingerprint authentication method according to claim 4, wherein
    the using frequency recording step comprises: updating using frequency record information of the finger templates and the fingerprint templates when the fingerprint template matches with the fingerprint information.

6. The fingerprint authentication method according to claim 2, wherein in the finger template selection step, a basis for selecting a finger template is to select a finger template that has a highest priority level defined by a user from the finger templates on which selection has not been performed.

7. The fingerprint authentication method of claim 1, wherein the fingerprint template refers to a recorded fingerprint feature in the case that a fingerprint recognition module needs to be pressed for several times to record fingerprint features at different regions of a finger, so as to register the entire finger.

8. A fingerprint authentication system, comprising:
    a fingerprint receiving module configured to receive fingerprint information input by a user;
    a finger template selection module configured to select a finger template from a plurality of finger templates, wherein a basis for selecting the finger template is to select a finger template that has a highest using frequency in a current application scenario from the plurality of finger templates on which the selection has not been performed, the current application scenario being from a plurality of application scenarios;
    a fingerprint template matching module configured to select a fingerprint template from a plurality of fingerprint templates, the plurality of fingerprint templates corresponding to a finger template of a specific finger, that has a highest using frequency from fingerprint templates on which matching has not been performed, and match the fingerprint template with the fingerprint information,
    wherein a fingerprint authentication succeeds when the fingerprint template matches with the fingerprint information, and
    the fingerprint template matching module re-performs selecting and matching when the fingerprint template fails to match with the fingerprint information; and
    a recording module configured to update using frequency record information of the fingerprint templates and finger templates in the current scenario when the fingerprint template matches with the fingerprint information.

9. The fingerprint authentication system according to claim 8, wherein the fingerprint authentication system further comprises:
    a finger template selection module configured to select, from a finger template database, the finger template.

10. The fingerprint authentication system according to claim 9, wherein the finger template selection module is further configured to re-perform finger template selection to select a new finger template if all fingerprint templates corresponding to the finger template as selected by the finger template selection module fail to match with the fingerprint information; and wherein the fingerprint authentication fails if no finger template on which selection has not been performed in the finger template database.

11. The fingerprint authentication system according to claim 9, wherein a basis for selecting a finger template by the finger template selection module is to select a finger template that has a highest using frequency from the finger templates on which selection has not been performed.

12. The fingerprint authentication system according to claim 11, wherein
the recording module is configured to update using frequency record information of the finger templates and the fingerprint templates when the fingerprint template matches with the fingerprint information.

13. The fingerprint authentication system according to claim 9, wherein a basis for selecting a finger template by the finger template selection module is to select a finger template that has a highest priority level defined by a user from the finger templates on which selection has not been performed.

14. A terminal supporting fingerprint authentication, comprising a fingerprint authentication system comprising:
a fingerprint receiving module configured to receive fingerprint information input by a user;
a finger template selection module configured to select a finger template from a plurality of finger templates, wherein a basis for selecting the finger template is to select a finger template that has a highest using frequency in a current application scenario from the plurality of finger templates on which the selection has not been performed, the current application scenario being from a plurality of application scenarios;
a fingerprint template matching module configured to select a fingerprint template from a plurality of fingerprint templates, the plurality of fingerprint templates corresponding to a finger template of a specific finger, that has a highest using frequency from fingerprint templates on which matching has not been performed, and match the fingerprint template with the fingerprint information,
wherein a fingerprint authentication succeeds when the fingerprint template matches with the fingerprint information, and
the fingerprint template matching module re-performs selecting and matching when the fingerprint template fails to match with the fingerprint information; and
a recording module configured to update using frequency record information of the fingerprint templates and finger templates in the current scenario when the fingerprint template matches with the fingerprint information.

\* \* \* \* \*